(12) United States Patent
Hinterberger et al.

(10) Patent No.: US 10,110,061 B2
(45) Date of Patent: Oct. 23, 2018

(54) ENERGY STORAGE DEVICE FOR AN ELECTRICAL AC VOLTAGE GRID

(71) Applicant: AUDI AG, Inglostadt (DE)

(72) Inventors: Michael Hinterberger, Ingolstadt (DE); Berthold Hellenthal, Schwanstetten (DE); Uwe Opitz, Karlshuld (DE)

(73) Assignee: Audi AG, Ingolstadt (DE)

( * ) Notice: Subject to any disclaimer, the term of this patent is extended or adjusted under 35 U.S.C. 154(b) by 209 days.

(21) Appl. No.: 15/245,927

(22) Filed: Aug. 24, 2016

(65) Prior Publication Data

US 2017/0063152 A1 Mar. 2, 2017

(30) Foreign Application Priority Data

Aug. 25, 2015 (DE) .................. 10 2015 011 230

(51) Int. Cl.
*H02J 1/10* (2006.01)
*H02J 13/00* (2006.01)
(Continued)

(52) U.S. Cl.
CPC ............ *H02J 13/0006* (2013.01); *H02J 3/18* (2013.01); *H02M 7/68* (2013.01)

(58) Field of Classification Search
CPC ........... H02J 3/18; H02J 13/0006; H02M 7/68
See application file for complete search history.

(56) References Cited

U.S. PATENT DOCUMENTS 4,171,491 A 10/1979 Theyse
9,413,185 B2 * 8/2016 Kim ..................... H02J 7/007
(Continued)

FOREIGN PATENT DOCUMENTS

CN 102652387 A 8/2012
CN 103166325 A 6/2013
(Continued)

OTHER PUBLICATIONS

"Vehicle to Grid", Wikipedia Article, Feb. 1, 2015, and English translation thereof.
(Continued)

*Primary Examiner* — Jared Fureman
*Assistant Examiner* — Duc M Pham
(74) *Attorney, Agent, or Firm* — Henry M. Feiereisen LLC

(57) ABSTRACT

An energy storage device for storing energy for a stationary AC voltage grid includes a control device; and at least two switching units. Each switching unit includes multiple storage elements for storing a part of the energy, a converter having an AC voltage connection for connection to the AC voltage grid and a DC voltage connection, and a multiplexer switching device electrically connected with the DC voltage connection of the converter and with one of the storage elements via a respective storage connection. The multiplexer switching device is configured to select one of the storage connections in dependence on a selection signal generated by the control device and to electrically connect only the one storage connection selected by multiplexer switching device with the DC voltage connection of the converter. The control device is configured to control the converter of each of the at least two switching units so as to gradually reduce an energy flow between the AC voltage grid and a first one of the switching units and to correspondingly increase an energy flow between the DC voltage grid and at least one second one of the switching units until the energy flow between the AC voltage grid and the first switching unit is reduced to zero.

12 Claims, 1 Drawing Sheet

(51) Int. Cl.
*H02J 3/18* (2006.01)
*H02M 7/68* (2006.01)

(56) References Cited

U.S. PATENT DOCUMENTS

| | | |
|---|---|---|
| 2005/0281064 A1 | 12/2005 | Olsen et al. |
| 2006/0007622 A1* | 1/2006 | Furukawa ............. H02J 7/0021 361/115 |
| 2008/0079434 A1* | 4/2008 | Oosawa ................ H01M 10/48 324/433 |
| 2013/0342018 A1* | 12/2013 | Moon ....................... H02J 3/32 307/80 |
| 2014/0346873 A1 | 11/2014 | Colangelo et al. |
| 2014/0347013 A1* | 11/2014 | Kim ................... G01R 31/3606 320/134 |
| 2015/0028669 A1 | 1/2015 | Schmidt et al. |

FOREIGN PATENT DOCUMENTS

| | | |
|---|---|---|
| CN | 103765718 A | 4/2014 |
| DE | 195 35 752 A1 | 3/1997 |
| DE | 100 48 035 A1 | 5/2002 |
| DE | 10 2007 046 033 A1 | 5/2008 |
| DE | 10 2013 004 400 A1 | 9/2014 |
| JP | 2006-262804 | 10/2006 |
| JP | 2006-353020 | 12/2006 |
| JP | 2014-192992 | 10/2014 |
| KR | 10-1483517 B1 | 1/2015 |

OTHER PUBLICATIONS

Chinese Search Report dated Jun. 26, 2018 with respect to counterpart Chinese patent application 2016107172597.

Translation of Chinese Search Report dated Jun. 26, 2018 with respect to counterpart Chinese patent application 2016107172597.

* cited by examiner

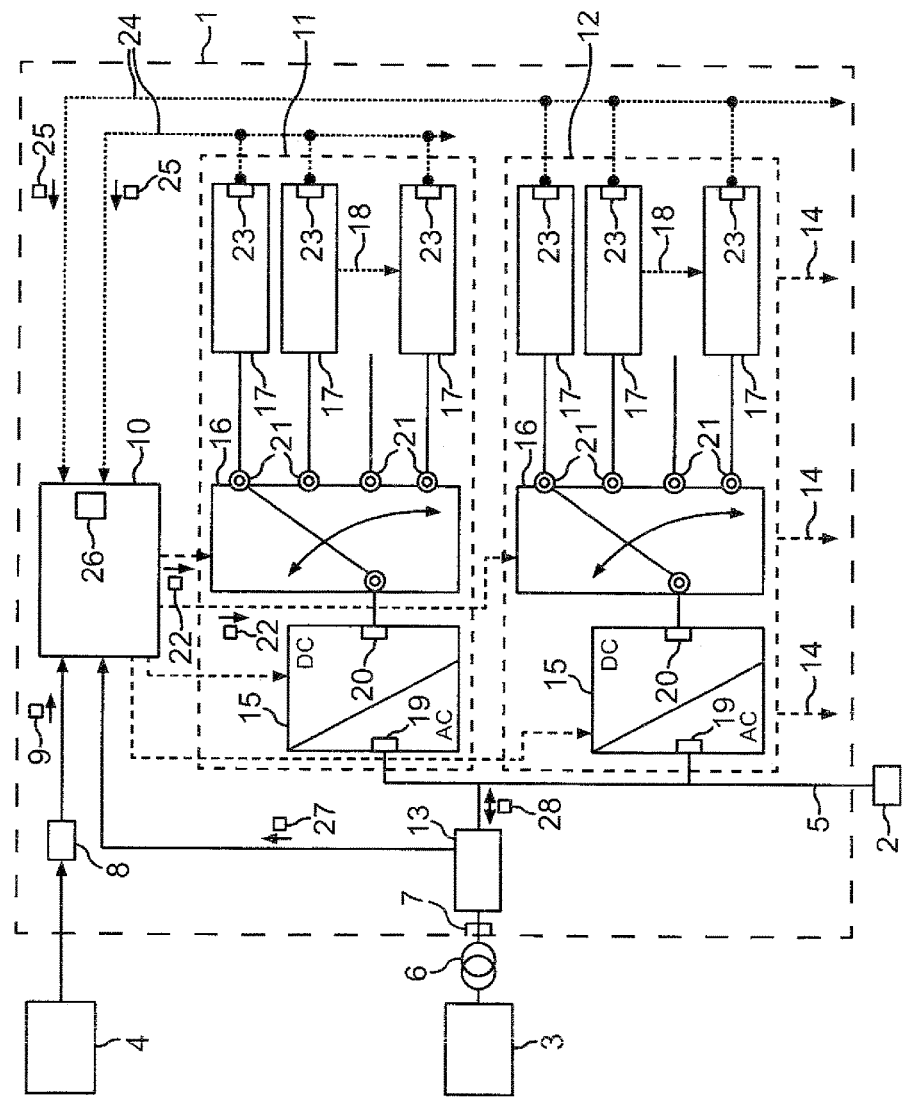

ENERGY STORAGE DEVICE FOR AN ELECTRICAL AC VOLTAGE GRID

CROSS-REFERENCES TO RELATED APPLICATIONS

This application claims the priority of German Patent Application, Serial No. 10 2015 011 230.9, filed Aug. 25, 2015, pursuant to 35 U.S.C. 119(a)-(d), the disclosure of which is incorporated herein by reference.

BACKGROUND OF THE INVENTION

The invention relates to an energy storage device for an AC voltage grid.

The following discussion of related art is provided to assist the reader in understanding the advantages of the invention, and is not to be construed as an admission that this related art is prior art to this invention.

An energy storage device of the aforementioned type is for example known from US 2014/034873 A1. The energy storage device described therein can have multiple batteries, which can individually or together be connected with a connector to connect the energy storage device with an AC voltage grid. When the battery is discharged it is connected in parallel with a charged reserve battery by a Hot-Swap-Controller and then the discharged battery is disconnected. This enables a continuous energy flow from the energy storage device into the AC voltage grid.

A disadvantage of such a connection is that compensation currents can flow between the batteries because the charged battery always generates a greater direct voltage than the discharged battery. In order to prevent such a compensation current when connecting two batteries in parallel to each other each individual battery is connected to the remaining part of the energy storage device via a direct voltage converter or DC-DC-converter. This renders the production of the energy storage device component- and cost-intensive.

It would therefore be desirable and advantageous to provide an energy storage device for a stationary AC voltage grid for storing energy.

SUMMARY OF THE INVENTION

According to one aspect of the invention an energy storage device for storing energy for a stationary AC voltage grid that includes at least one user and/or at least one regenerative energy source, includes a control device; and at least two switching units, each including multiple storage elements for storing a part of the energy, a converter having an AC voltage connection for connection to the AC voltage grid and a DC voltage connection, and a multiplexer switching device electrically connected with the DC voltage connection of the converter and with one of the storage elements via a respective storage connection, wherein the multiplexer switching device is configured to select one of the storage connections in dependence on a selection signal generated by the control device and to electrically connect only the one storage connection selected by multiplexer switching device with the DC voltage connection of the converter, wherein the control device is configured to control the converter of each of the at least two switching units so as to gradually reduce an energy flow between the AC voltage grid and a first one of the switching units and to correspondingly increase an energy flow between the AC voltage grid and at least one second one of the switching units until the energy flow between the AC voltage grid and the first switching unit is reduced to zero.

The AC voltage grid can be for example the AC voltage grid of a household or an industrial building or a public building for example a parking garage. The energy storage device has a central control device and at least two switching units. Each switching unit is hereby configured as follows. The switching unit has multiple storage elements for storing a portion of the energy. For exchanging the energy with the AC voltage grid the switching unit has a converter. Another term for converter is active current converter or AC-DC converter. The converter has an AC voltage connection for connection to the AC voltage grid. The converter also has a direct voltage connection. Coupled with this direct voltage connection are the storage elements of the switching unit. Hereby a multiplexer switching unit is provided which is electrically connected with the direct voltage connection of the converter as well as with one of the storage elements via a respective storage connection. Hereby only one respective storage element is connected with one of the storage connections of the multiplexer switching device. The multiplexer switching device is configured to select one of the storage connections in dependence on a selection signal of the control device and to electrically connect only the selected storage connection with the direct voltage connection of the converter. In other words via the multiplexer switching device the direct voltage connection of the converter is connected at any time at most with a single storage element. Even though at least two switching units are provided no undesired compensation current can flow between a storage element of one of the switching units and a storage element of another one of the switching units because even though these two switching units are connected with each other via the AC voltage grid, two converters can control or block the compensation current.

In order to be able to switch between the storage elements by switching the multiplexer switching device without a resulting fluctuation of the energy flow between the energy storage device and the AC voltage grid, the control device is also configured to gradually reduce an energy flow between the AC voltage grid and a first one of the switching units by controlling the respective converter of the at least two switching units and to the same degree increase an energy flow between the AC voltage grid and at least one second one of the switching units until the energy flow of the first switching unit is reduced to zero. In other words the energy flow from the first switching unit is faded over to at least one other switching unit. As a result the total energy flow exchanged between the energy storage device and the AC voltage grid is not interrupted or changed in the AC voltage grid. For detecting the energy flow known sensors can be used which can for example be provided in the converter. For example the total electrical power actually conducted and exchanged over all converters can be detected and then the total power be kept constant while the electrical power in the converter of the first switching unit is gradually reduced.

The invention has the advantage that the energy storage device enables an exchange or switching of the storage elements that are currently electrically connected with the AC voltage grid without interruption even in the absence of additional DC-DC converters. Thus a fade-in and a fade-out is realized on the basis of at least two switching units.

According to another advantageous feature of the invention, the control device is configured to generate another selection signal after the energy flow between the AC voltage grid and the first switching unit is reduced to zero, and the multiplexer switching device selects another storage element in the first switching unit as a function of the another selection signal generated by the control device. As a result the first switching unit is then available again for output or uptake of energy. The switching unit provides an energy uptake when a discharged or empty storage element is selected and energy is to be stored by means of the energy storage device, for example from a regenerative energy source, which can be connected to the AC voltage grid, or from a supply network in order to be able to output electrical energy in a future time interval by means of the energy storage device.

According to another advantageous feature of the invention, the storage element, which is to be electrically connected with the converter, is selected in the switching unit on the basis of a wear criterion. For this purpose each storage element has a monitoring device. When vehicle batteries are used as storage element the battery management system, BMS, which is integrated in such vehicle batteries, can be used as monitoring device. In this case no additional sensor system is required. The control device of the energy storage device is configured to generate the selection signal in dependence on operating states of all storage elements so that a wear criterion for all storage elements is satisfied. As a result of the permanent monitoring of the storage elements, in particular of vehicle batteries, by means of the monitoring devices and the higher order control device the wear criterion can be a uniform aging of all storage elements so that for example new storage elements are charged/discharged more frequently than older storage elements. The wear criterion can for example also provide a switching pattern for the multiplexer switching units in order to hereby realize a more gentle operation or a controlled aging or a uniform operation of the storage elements. The wear criterion can also include a combination of multiple of the mentioned criteria.

According to another advantageous feature of the invention, the operating states can include at least one of the following state variables of the respective storage element: an ageing, a wear, a cycle number of charging and discharging processes, a state of charge, a residual capacity and/or a temperature. The control device can hereby determine an optimal operating point of the respective storage element. Based on the known residual capacity/states of charge the storage elements, in particular vehicle batteries, can be activated or deactivated in dependence on the actual operating point as described by the operating data. By way of the actual operating data the control device permanently individually monitors and analyzes the actual energy state of the storage elements. This allows always activating the storage element based on the wear criterion, which is most suited based on the boundary conditions. The boundary conditions include the ageing defined by the operating data, the state of charge, the residual capacity and/or the temperature of the storage element.

According to another advantageous feature of the invention, also external boundary conditions are taken into account. For this purpose a receiving device for receiving environmental data, in particular of external network parameters and/or weather data, can be provided and the control device is configured to generate the selection signal based on the environmental data and hereby take a future availability and/or a future unavailability of a regenerative energy into account. For example increasing or decreasing wind can be described by the environmental data. Also for example a time of day can be described and/or the sunrise and/or sunset time can be given.

According to another advantageous feature of the invention, also the actual load request is taken into account. For this purpose a network connection for connection of an electrical supply network is connected with the AC voltage grid via a detection device. The electrical supply network can be a public supply network, which may for example include high-performance energy sources such as for example a nuclear power plant or a coal power plant. The detection device via which the AC voltage grid is coupled with the network connection is configured to determine at least one electrical variable regarding an external energy exchanged between the supply network and the AC voltage grid. Thus based on the at least one detected electrical variable it is described whether energy or power flows into the AC voltage grid or out of the AC voltage grid back into the supply network, for example due to an excess of energy provided by the regenerative energy sources. The control device is configured to control the respective converter of each switching unit in dependence on the at least one electrical variable so that a balance of the exchanged external energy satisfies a predetermined minimizing criterion. The minimizing criterion can for example state that the external energy inputted or transferred into the AC voltage grid is to be minimized or is minimized to zero. The minimizing criterion can also be that the energy balance is negative and to transfer as much energy as possible into the supply network, i.e., "negative external" energy" or own energy.

The electrical variables can include an active power, a reactive power, an apparent power, a power factor cos φ, phase currents of a three-phase power line, or electrical voltages of the phase lines. From this the direction of flow of the exchanged energy can be determined, i.e., whether external energy is obtained from or own energy is inputted into the supply network.

According to another advantageous feature of the invention, the storage elements can be configured technically different from each other. For example at least two storage elements may generate a different direct voltage. This can also be the case when the same storage elements have a different charge state. For this case the control device is configured to adjust a voltage value in a voltage regulator of the converter in dependence on the operating states of the storage connected to the selected storage connection. This has the advantage that when switching the multiplexer switching device no undesired high discharge current or charge current due to a voltage difference between the storage connection on one hand and the storage element on the other hand is generated.

According to another advantageous feature of the invention, each multiplexer switching device can have a mechanical switch and/or at least one transistor for selecting the storage element. The mechanical power switch can be a contactor or a relay. The transistor can for example be an IGBT (Insulated Gate Bipolar Transistor) or a power MOFSET (metal-oxide-semiconductor field effect transistor).

For providing a storage element different storage technologies can be combined by means the multiplexer switching device due to the flexible operability of the converter and the separation of the storage elements. High-voltage battery systems, but also used battery systems and also other electrical energy storage device systems such as dual layer capacitors, a fuel cell, an electrical flywheel mass battery or an emergency generator can be used. When using an emergency generator as storage also a fuel storage can be used for storing chemical energy.

In order to be able to also use used or new high-voltage batteries of a motor vehicle an embodiment provides that at least one communication bus for connecting a battery-internal battery control unit, i.e., a battery management system, of a high-voltage vehicle battery is provided. The control device is configured to perform a restbus simulation on the battery control unit via the communication bus, wherein the restbus simulation includes a communication with at least one simulated control device of a motor vehicle. This has the advantage that operating software of a high-voltage battery does not have to be adjusted when the high-voltage battery is uninstalled from a motor vehicle and is connected with a storage connection of one of the multiplexer switching devices. This is because in order for a battery to be able to take up energy (charging) or output energy (discharging) defined conditions have to be met. In particular a high-voltage battery has to be able to communicate with control devices (for example a power electronics, an electronic stability controller, ESC, an anti-blocking system ABS) via the communication bus. Because such control devices are not provided in the energy storage device the restbus simulation can simulate any required control device so that the high-voltage battery can still be operated as if it was installed in a motor vehicle.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic representation of an embodiment of the energy storage device according to the invention,

DETAILED DESCRIPTION OF PREFERRED EMBODIMENTS

In the drawing, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows an energy storage device 1 which can for example be provided in a household or a building block or in an industrial building or on a factory premises or in a parking garage or another public building. Also shown are electrical consumers and/or energy sources (represented by a single element 2), which are to be supplied by means of the energy storage device 1, wherein the supply includes the provision of energy as well as the uptake of excessive energy. Also shown is a public supply network 3 which can for example be a medium-voltage supply network (20-kV-network). Further shown is an external data source 4 which can for example be a data server of the internet. The data source 4 can additionally or alternatively include a weather station.

The energy storage device 1 is connected with consumers and/or energy sources 2 via a AC voltage grid 5 in which for example a 230V AC voltage/400V AC voltage can be provided. The supply network 3 can be connected to a network connector 7 of the energy storage device 1 via a transformer 6. A receiving device 8 can receive environmental data 9 from the data source 4. For this purpose the receiving device 8 can for example provide an internet connection to the data source in a known manner.

The energy storage device 1 has a central control device 10, multiple switching units 11, 12 and a detection device 13. The control device can for example be provided by a processing device. The processing device can for example have a microprocessor or a microcontroller. Instead of the shown two switching units 11, 12 also further switching units can be provided as indicated by the additional symbols 14.

Each switching unit 11, 12 has a converter 15, a multiplexer switching device 16 and multiple storage elements 17. Instead of the respective three shown storage elements 17 each switching unit 11, 12 may also only have two storage elements or more than three storage elements. This is indicated in FIG. 1 by reference numerals 18. Each converter 15 has an AC voltage connection 19, which is connected to the AC voltage grid 5. The multiplexer switching device 16 is connected to a DC voltage connection 20 of the converter 15. The multiplexer switching device 16 electrically connects the DC voltage connection 20 with a respective one of multiple storage connections 21 in dependence on a selection signal 22 of the control device 10. As a result the converter can exchange electrical energy between the AC voltage grid 5 and the connected storage element 17.

Each storage element 17 has a monitoring device 23, which detects operating state data of the respective storage element 17. The operating state data can for example include the age, a state of health (SOH), a cycle number of performed charging and/or discharging cycles, an actual state of charge (SOC), a residual capacity or residual storage capacity and/or a temperature. The monitoring device 12 of a switching unit 11, 12 can respectively be coupled with the control device 10 via a communication bus 24. The control device 10 can hereby read or receive operating state data 25. The communication bus 24 can be a CAN-bus (Controller Area Network). When the storage element 17 is a vehicle battery a restbus simulation 26, which simulates the already described communication between control devices of a motor vehicle and the storage element 17, can also be performed by the control device 10 via the communication bus 24.

The detection device 13 can detect electrical variables 27 which can also be transmitted to the control device 10. The electrical variables 27 describe the exchange of electrical current or generally electrical energy 28. When the energy 28 has a positive value the energy is external energy, which is transmitted from the supply network 3 into the AC voltage grid 5. When the energy 28 has a negative value the energy is surplus energy or energy which is transmitted from the AC voltage grid 5 into the supply network 3.

The energy storage device 1 thus includes at least two (preferably bidirectional) inverters, i.e., converters. The converters effect the adjustment and/or synchronization with the AC voltage grid 5 on one hand and the DC voltage of the storage elements 17 on the other hand in that energy is transmitted in a targeted manner by adjusting voltage levels and/or AC voltage phases. The fact that only one respective storage element 17 is coupled with the respective converter results in an automatic galvanic separation between the storage elements 17 of each of the switching units 11, 12.

Further provided is the detection device 13 as network analyzer which provides information regarding the actual energy flows into the system and out of the system as electrical variables 27, i.e., for example an effective power P, a reactive power Q, an apparent power S, a power factor $\cos \varphi$, or phase currents $I_{L1}$, $I_{L2}$, $I_{L3}$, $U_{L1}$, $U_{L1}$, $U_{L2}$, $U_{L3}$.

Further provided are energy storage devices of any number as energy storage device elements 17, which enable the uptake and output of energy for an intermediate energy storage. Preferably this can include used energy storage devices i.e., so-called $2^{nd}$ life energy storage device systems.

Further provided are at least two multiplexer switching units which function as power transmitters or power couplers. The multiplexer switching units represent the link between the energy storage devices and a respective one of the converters. The multiplexer switching units are switched by the control device 10. Only one respective energy storage device is connected with the converter at any time. At least two electrically independent multiplexer switching units are required. This makes it possible to switch the energy storage devices also in case of an external load request. Power fluctuations on the primary side in the AC voltage grid 5 during the switching process are avoided. Such a fade-over between the storage element of a switching unit to a storage element 17 of another switching unit 12 enables changing or exchanging the used storage element 17 without having to interrupt the operation of the energy storage device 1.

For an electrical energy storage device it is oftentimes required to be able to store very large amounts of energy even though the actual energy exchange is performed with a relatively small power. An example for such an energy storage device 1 is an energy storage device for a photovoltaic system. In this case the ratio between power and energy can for example be 1 to 10 or 1 to 100. This requirement is solved by the energy storage device 1 which operates a plurality of storage elements 17 in time multiplex. For this the multiplexer switching devices 16 are provided. Via the multiplexer switching devices 16 always exactly one storage element 17 is connected with the power electronics current supply for bidirectional energy exchange (charging/discharging), i.e., with the converter 15. The higher order control device 10 takes over the control of the multiplexer switching devices 16.

The control device controls the energy exchange between the switching units 11, 12 and the AC voltage grid 5 by open loop/closed loop control in particular so that a regulation of the energy exchanged between the AC voltage grid 5 and the supply network 3 energy 28 is provided. For this the electrical variables 27 can be detected or used by the detection device 13 as data. The multiplexer switching devices 16 and the converters 15 are then controlled based on these data. The closed loop/open loop control monitors the actual energy flow into the system and out of the system and the actual state of the energy storage device systems, i.e., the energy storage device elements 17. The closed loop/open loop control also performs the switching of the multiplexer switching devices 16 so that the storage element 17 that is best suited for the actual load path is selected.

In order to prevent energy or power output/input fluctuations during the switching of multiplexer switching devices 16 the described fade-in fade-out process is stored in the open loop/closed loop control. This ensures that a multiplexer switching device first switches load free, i.e., that the AC voltage generated by the connected converter has the same amplitude and phase as the AC voltage present in the AC voltage grid 5. Only then is the power exchanged between the AC voltage grid 5 and the converter 15 is ramped up to the target value. The target value is hereby the power that was previously exchanged between another converter 15 and the AC voltage grid 5. In parallel to this, this converter reduces the value of the exchanged electrical power. For this the actual storage element 17 is monitored and its power output/input is adjusted to the total power request. When the second energy storage device is completely activated and its power has reached the target value, the power output/input of the first energy storage device can be ramped down completely. Only when the power is completely ramped down, i.e., no power is exchanged with the AC voltage grid 5 any more, the multiplexer switching device separates the first energy storage device and connects with the next one. This renders the switching processes in the multiplexer switching devices 16 voltage-free. This prevents in particular the formation of electric arcs.

This allows switching from one storage element to the next without energy interruption. For this purpose for example at least one second multiplexer switching device can already perform a change parallel to the first multiplexer switching device 16 during ongoing operation and initially not yet effect energy output and not yet permit an output or input of energy. In the next step the first energy storage device is slowly taken off the network, i.e., the current flow is continuously reduced and at the same time the second energy storage device connected to the network. For increasing the total power it is advantageous to operate many multiplexer switching devices 16 in parallel, wherein here in particular the n plus 1 principle applies, i.e., an additional switching unit 11, 12 is always provided in order to be able to perform the described fade-in-fade-out.

Via the network analyzer the load requests of the AC voltage grid 5 are directly determined in the described manner and correspondingly transmitted to the control device 10. In addition the environmental data 9 can be taken into account in the described control in dependence on the actual energy requirement. These environmental data can include external network parameters, such as a need-based current control or network stabilizing request of energy provider companies. Network stabilizing requests can for example occur in a wind energy system when its generated electrical power varies due to increasing or decreasing wind. Further environmental data 9 can include a weather forecast regarding weather conditions (sunshine, wind, storm, snowfall, temperature changes) which allows adjusting load and storage requirements to the environmental data, i.e., the load request is adaptively adjusted to the environmental data 9.

Many storage elements can be connected to the described multiplexer switching devices 16. In particular when using high-voltage batteries of motor vehicles as storage elements 17, it is possible to use complete vehicle batteries in an energy storage device system without having to adapt the hardware or software. The battery systems can be directly obtained from the motor vehicle and installed as storage elements in the energy storage device. Depending on the wiring of the high-voltage batteries these can be operated in parallel, in series or as a combination of these two variants. Such a connection results in a respective storage element 1. This allows universally adjusting a high-voltage battery to the demands/conditions. In addition the total capacity of the storage element 17 is increased. Instead of the described high-voltage batteries in a storage element 17 also other ones of the already described energy storage devices or energy sources can be contained in the form of emergency generators.

Further advantages are the modularity, scalability and expandability by any desired number of storage elements 17. The limiting factors are only the number of the connections of the multiplexer switching devices 16, the required wiring and the number of available converters. Of course also new high-voltage batteries can be used as electrical energy storage devices.

Overall the example shows how a ($2^{nd}$-Life) multiplex-energy storage device system can be provided by the invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An energy storage device for storing energy for a stationary AC voltage grid that includes at least one user and/or at least one regenerative energy source, said energy storage device comprising:
   a control device; and
   at least two switching units, each comprising multiple storage elements for storing a part of the energy, a converter having an AC voltage connection for connection to the AC voltage grid and a DC voltage connection, and a multiplexer switching device electrically connected with the DC voltage connection of the converter and with one of the storage elements via a respective storage connection, wherein the multiplexer switching device is configured to select one of the storage connections in dependence on a selection signal generated by the control device and to electrically connect only the one storage connection selected by multiplexer switching device with the DC voltage connection of the converter,
   wherein the control device is configured to control the converter of each of the at least two switching units so as to gradually reduce an energy flow between the AC voltage grid and a first one of the switching units and to correspondingly increase an energy flow between the AC voltage grid and at least one second one of the switching units until the energy flow between the AC voltage grid and the first switching unit is reduced to zero.

2. The energy storage device of claim 1, wherein the control device is configured to generate another selection signal after the energy flow between the AC voltage grid and the first switching unit is reduced to zero, and wherein the multiplexer switching device selects another storage element in the first switching unit as a function of the another selection signal.

3. The energy storage device of claim 1, wherein each storage element has a monitoring device for determining respective operating state data of the storage element, and wherein the control device is configured to generate the selection signal in dependence on the operating state data of all storage elements so that a wear criterion for all storage elements is satisfied.

4. The energy storage device of claim 3, wherein the operating state data include at least one state variable of the respective storage element selected from the group consisting of an age, a wear, a number of cycles, a state of charge, a residual capacity and a temperature.

5. The energy storage device of claim 3, wherein the control device is configured to adjust a target voltage value in a voltage regulator of the converter in dependence on the operating state data of the storage element connected to the selected storage connection.

6. The energy storage device of claim 1, further comprising a receiving device for receiving environmental data, wherein the control device is configured to generate the selection signal in dependence on the environmental data, to thereby take a future availability of a regenerative energy source into account and/or to compensate a future unavailability of a regenerative energy.

7. The energy storage device of claim 6, wherein the environmental data are parameters of an external network and/or weather data.

8. The energy storage device of claim 1, further comprising a detection device, wherein a network connection for connection of an electrical supply network is connected with the AC voltage grid via the detection device, wherein the detection device is configured to determine at least one electrical variable regarding an electrical external energy exchanged between the supply network and the AC voltage grid, and wherein the control device is configured to control each converter in dependence on the at least one electrical variable so that a balance of the exchanged external energy satisfies a predetermined minimizing criterion.

9. The energy storage device of claim 1, wherein each multiplexer switching device has at least one mechanical switch and/or at least one transistor for selecting the storage element.

10. The energy storage device of claim 1, wherein each storage element has at least one of a battery, a dual layer capacitor, a fuel cell, a flywheel storage and an emergency generator.

11. The energy storage device of claim 10, wherein the battery is a vehicle high-voltage battery.

12. The energy storage device of claim 1, further comprising at least one communication bus for connection of a battery internal battery control unit of a vehicle high-voltage battery, wherein the control device is configured to perform a restbus simulation on the battery control unit, said restbus simulation including a communication with at least one simulated control device of a moor vehicle.

* * * * *